June 10, 1941.  F. D. BANNING  2,244,667
MACHINE FOR MAKING FASTENERS
Filed Sept. 22, 1937  9 Sheets-Sheet 1

Fig. 1.

INVENTOR.
Frederick D. Banning
BY Kelley & Chisholm
ATTORNEYS.

INVENTOR.
Frederick D. Banning
BY
ATTORNEYS.

Patented June 10, 1941

2,244,667

UNITED STATES PATENT OFFICE 2,244,667

MACHINE FOR MAKING FASTENERS

Frederick Dunlevy Banning, Cleveland, Ohio, assignor to Talon, Inc., a corporation of Pennsylvania Application September 22, 1937, Serial No. 165,089

16 Claims. (Cl. 153—1)

This invention relates to a machine for automatically attaching fastener elements to a tape or stringer and particularly to a machine for attaching fastener elements of the slide-actuated type.

The principal object of the invention is to provide an improved machine for the above purpose which is dependable and efficient, which is simple and easy to operate, which requires a minimum of servicing and which is capable of continuous operation over long periods of time. Other objects will be apparent as the nature of the invention is more fully disclosed.

In one embodiment the machine includes a hopper having means to orient and feed the individual fastener elements, a setting mechanism which positions the elements in predetermined spaced relationship on a tape, and clamping mechanism for clamping the elements to said tape. Mechanism is also provided to periodically interrupt the operation of the setting mechanism and to advance the tape so as to separate the elements into groups, each containing a given number of elements.

The machine also includes a counter for controlling the number of elements in each group and mechanism for preventing actuation of the counter when no fastener element is present in the setting mechanism, whereby the required number of elements will be set in each group regardless of any irregularity in the feed of the elements to the setting mechanism. The machine may be provided with electrical control means whereby the above details of operation are automatically carried out.

Various other features of the invention consist in the details of construction and combinations of parts hereinafter more fully set forth.

One embodiment of the invention is illustrated in the accompanying drawings, in which.

Certain specific terms are used herein for convenience in referring to various details of the invention. The terms, however, are to be given as broad an interpretation as the state of the art will permit.

Figure 1:
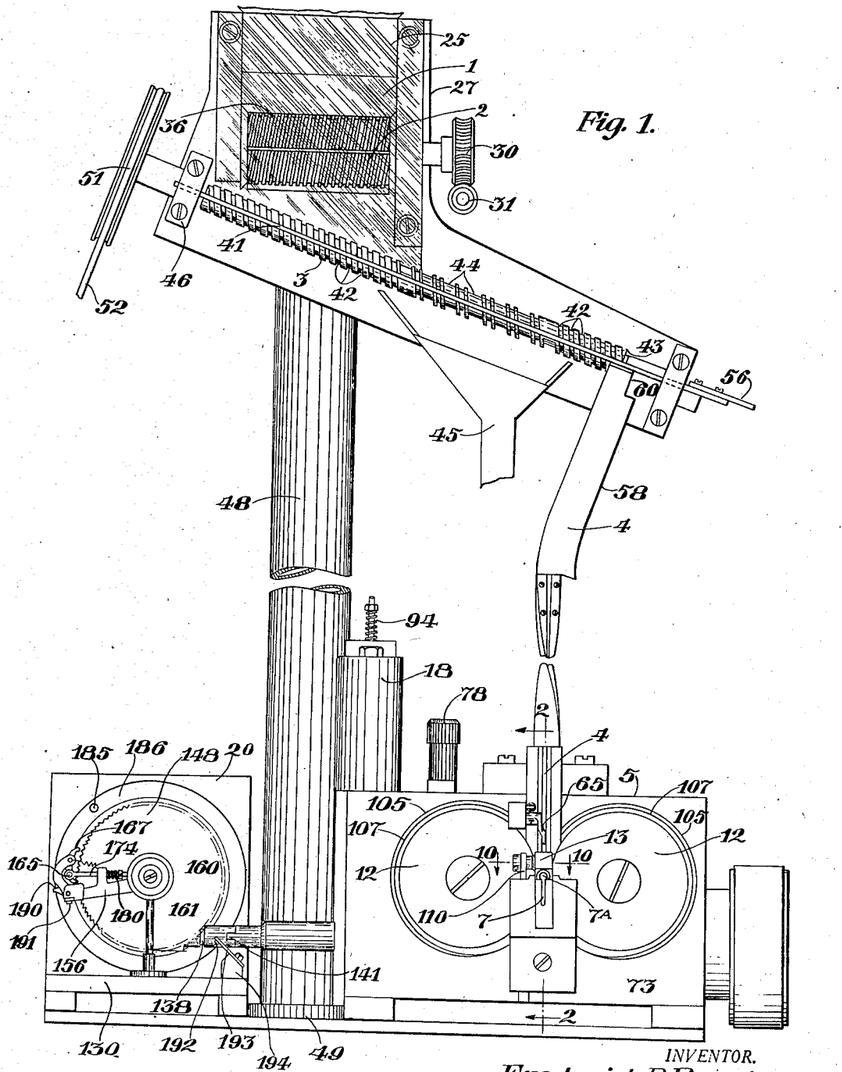
Fig. 1 is a side elevation of the machine.
Figure 2:
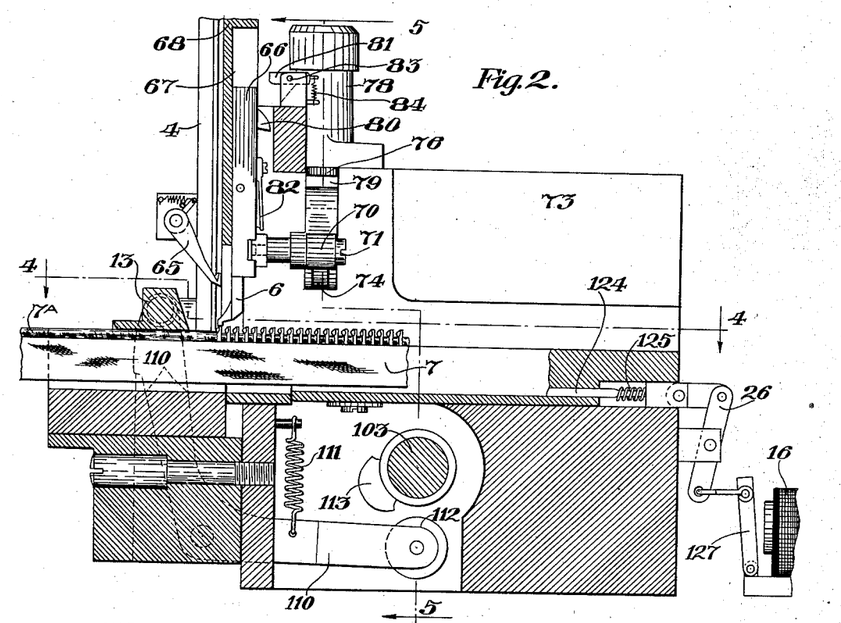
Fig. 2 is a longitudinal section taken on line 2—2 of Fig. 1 showing the path of the tape through the machine.
Figures 6, 7, 8:
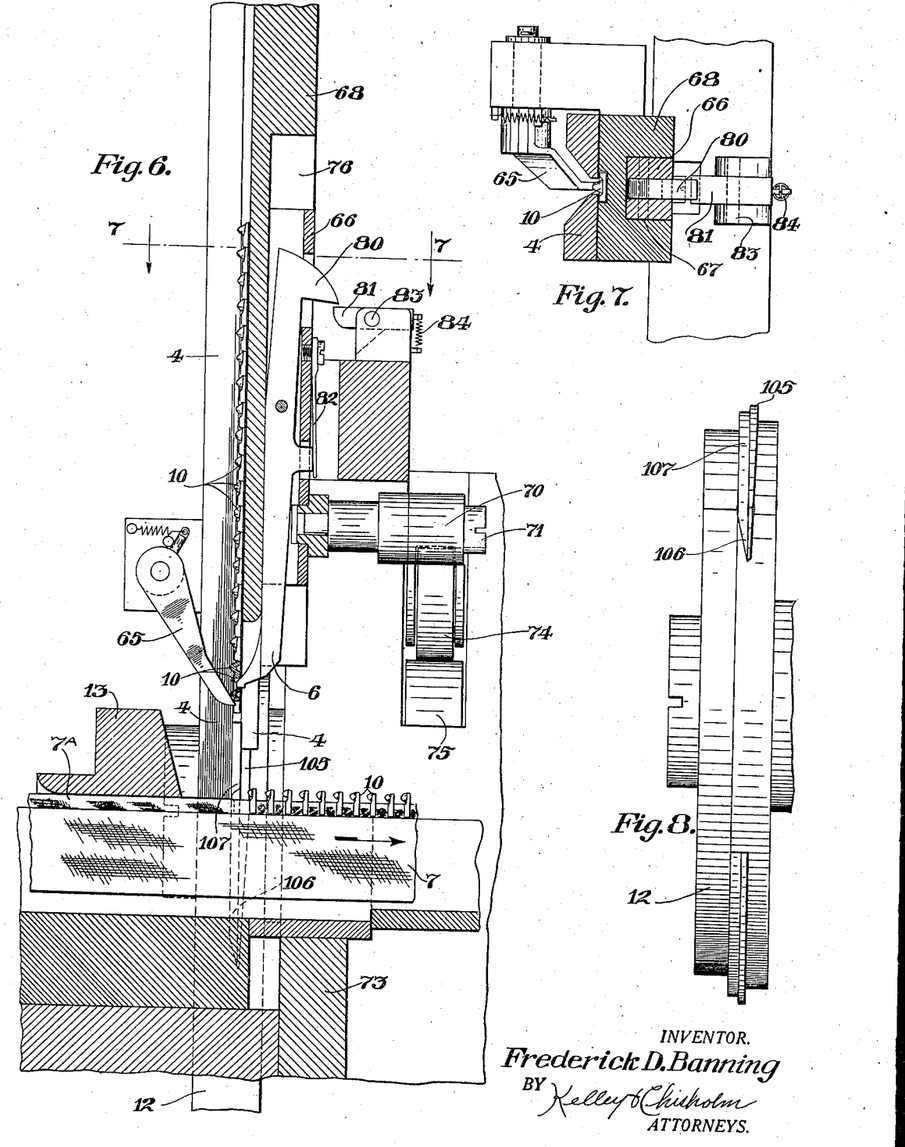
Fig. 6 is a vertical section through the setting mechanism.
Fig. 7 is a transverse section taken on line 7—7 of Fig. 6.
Fig. 8 is a detail view of a cam roller for clamping the elements on the tape.
Figures 10, 11, 12:
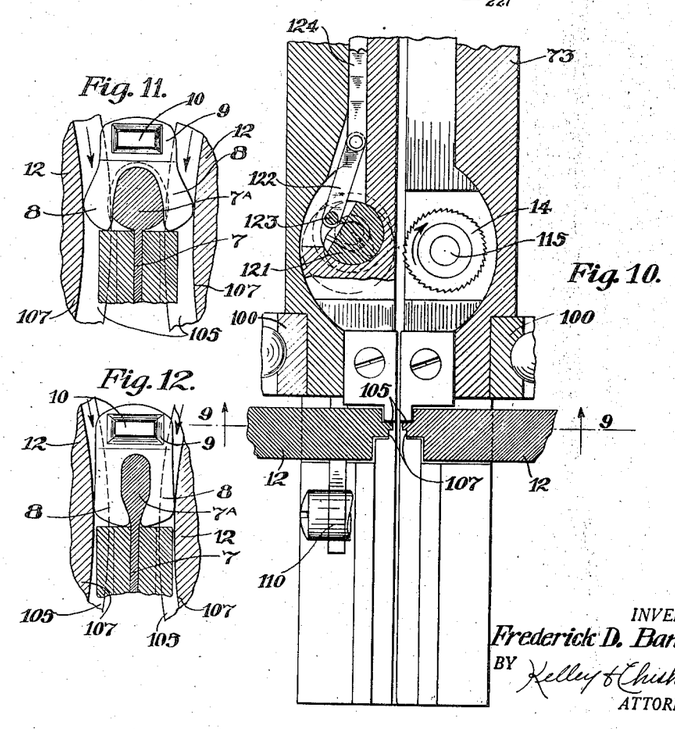
Fig. 10 is a section taken on line 10—10 of Fig. 1 showing the pull mechanism for advancing the tape.
Fig. 11 is a detail view showing a fastener element with jaws distended.
Fig. 12 is a detail view showing a fastener element with jaws clamped upon the tape.

Referring particularly to the embodiment of the invention illustrated in the drawings, the machine is shown in Fig. 1 as comprising a hopper 1 having an orienting roll 2 by which the individual fastener elements are oriented into the proper position for feeding, and are dropped onto a screw conveyor 3 by which they are conveyed to a feed chute 4. The feed chute 4 feeds the elements to the setting and clamping mechanism shown generally at 5 in Fig. 1 by which the individual elements are set and clamped in predetermined position on the strip material such as a tape or stringer 7 having a corded edge 7a (Figs. 11 and 12). The setting mechanism is shown in Figs. 2 and 6 as including a setting finger 6 which is adapted to pick the individual elements from the feed chute 4 and to set said elements over the corded edge 7a of the tape 7. The fastener elements may comprise a pair of jaws 8 which extend on opposite sides of the corded edge 7a as illustrated in Fig. 11 and a fastening section 9 which is stamped to form a head 10 on one side (Figs. 11 and 14) and a corresponding recess on the opposite side. The successive alternate elements on adjoining tapes or stringers are interlocked by a slider in a manner well known in the art.

Figure 9:
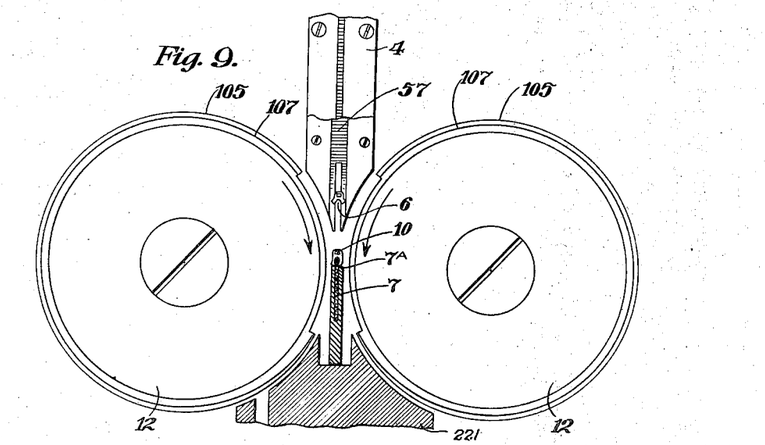
Fig. 9 is a section taken on line 9—9 of Fig. 10 showing the two cam rollers in operating position.

The elements, after being positioned as shown in Fig. 11, are clamped firmly upon the corded edge 7a by a pair of cam rollers 12 which are mounted on opposite sides of the element in a position to engage and clamp the same for the above purpose (Figs. 9, 10 and 12).

After each element has been set and clamped on the tape, the tape is fed a predetermined distance corresponding to the spacing between adjacent fastener elements by a presser foot 13 (Fig. 2).

For advancing the tape, as for example between groups of elements, a pull roll 14 (Fig. 4) is provided which continuously rotates and which causes the tape to advance when the tape is pressed thereagainst by an idler roll 15 which is controlled through suitable linkage by a magnet 16 hereinafter termed the "pull magnet."

In order to prevent the setting mechanism from operating while the tape is being advanced in response to the operation of pull magnet 16, a lockout mechanism is provided including a lockout solenoid 18 (Figs. 3 and 5) which is adapted, when energized, to prevent operation of the setting mechanism.

Figure 27:
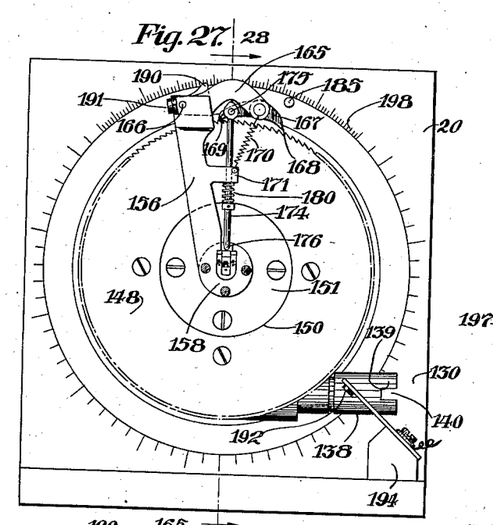
Fig. 27 is a front elevation of the counting device.
Figure 28:
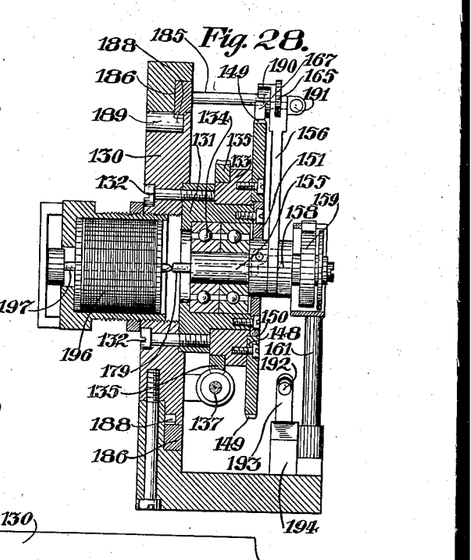
Fig. 28 is a section taken on line 28—28 of Fig. 27.

Suitable counting mechanism 20 (Figs. 1, 27 and 32) is provided for counting the number of elements which are set upon the tape and for closing a contact after a given number have been set to thereby operate suitable relays for energizing the pull magnet 16 and the lockout solenoid 18 so as to cause the tape to be advanced a given amount prior to the attachment of the next group of elements.

Referring to the detailed construction of the machine, hopper 1 may include a front plate 25, preferably of glass, a back plate 27, and side plates 40. The elements fall against the front plate 25 as they are oriented by means of the orienting roll 2 (Figs. 1 and 13 to 23). The hopper may also contain a sloping plate 26 to prevent the elements from being carried around by the rotating roll 2 into a position where they can wedge between the roll and the back plate 27 of the hopper. The roll 2 may be mounted upon a shaft 28 carried in suitable bearings 29 and having secured thereto a worm gear 30 cooperating with a worm drive 31 to which power may be supplied in any convenient manner, not shown.

The roll 2 is provided with a plurality of peripheral grooves 35 which are adapted to receive the heads 10 of the fastener elements. The roll is positioned with respect to the front plate 25 so that the jaws 8 of the fastener elements can pass between the surface of the roll and the plate but the heads 10 are prevented from passing the roll except when they fall into one of the grooves 35, in which case sufficient clearance is provided to permit the element to fall past the roll 2.

The roll 2 may be provided with a set of retractable blades 36 which are pressed outwardly, as by means of springs 37, and are positioned by shoulders 38 which engage cam surfaces 39, formed in or carried by the side plates 40 of the hopper 1. The cam surfaces 39 are so arranged that the blades 36 are retracted within the confines of the roll 2 before they pass the inclined plate 26, and are held in retracted position while they are passing the back plate 27 of the hopper. They are released, however, and spring outwardly while they are passing the front plate 25. In this position they will engage any fastener elements which may have been turned with their heads 10 toward the front plate 25, thereby forcing said elements upwardly into the hopper and permitting them to again fall downwardly and to be finally oriented by the roll 2.

Figures 13, 14, 15, 16, 17, 18, 19, 20:
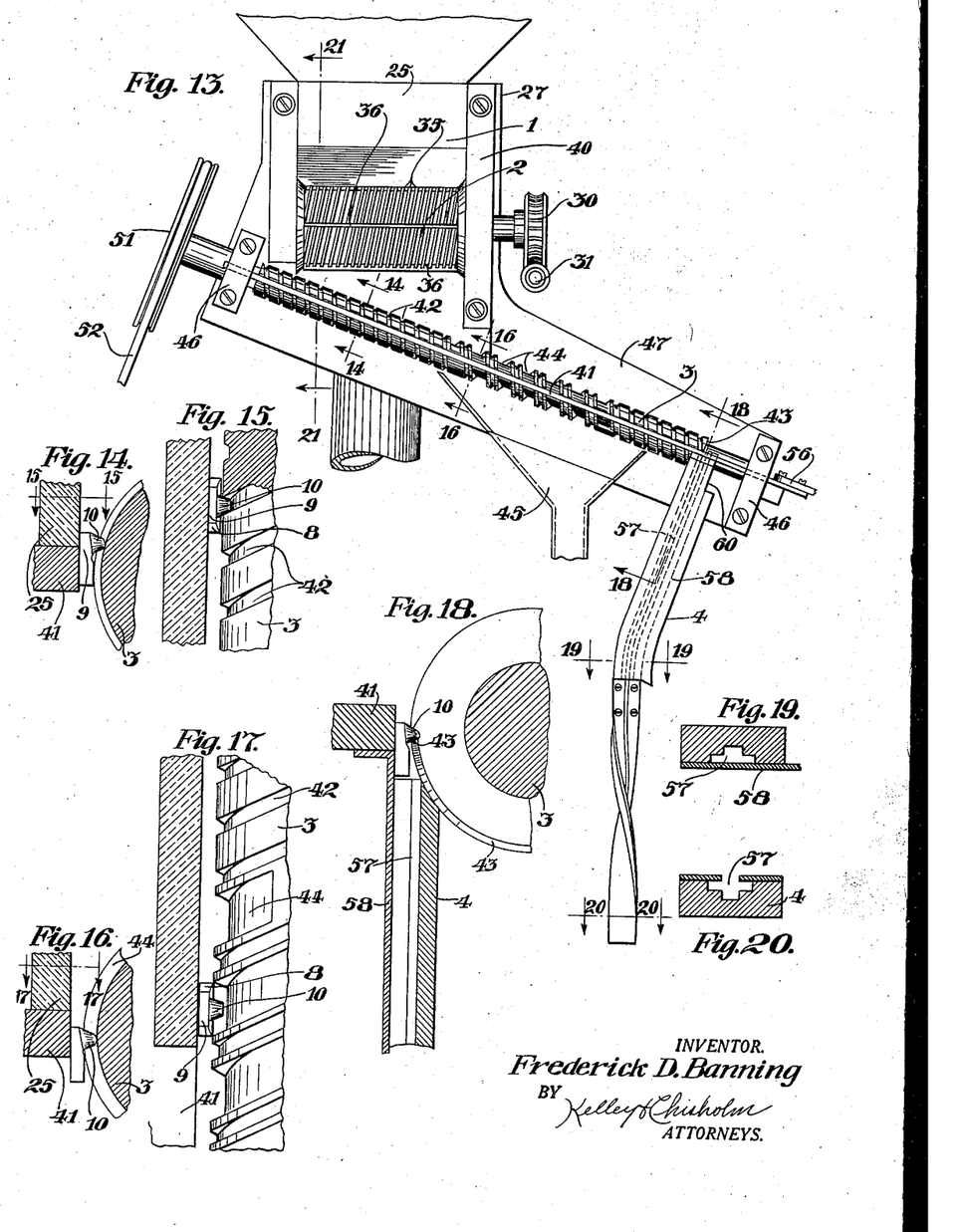
Fig. 13 is a side elevation of the orienting and feed mechanism.
Fig. 14 is a section taken on line 14—14 of Fig. 13, showing a fastener element in position for feeding to the screw conveyor.
Fig. 15 is a section taken on line 15—15 of Fig. 14.
Fig. 16 is a section taken on line 16—16 of Fig. 13 showing a fastener element in position to drop into the discard hopper.
Fig. 17 is a section taken on line 17—17 of Fig. 16.
Figs. 18, 19, 20 and 21 are sections taken on lines 18—18, 19—19, 20—20, and 21—21, respectively, of Fig. 13.
Figures 21, 25, 26:
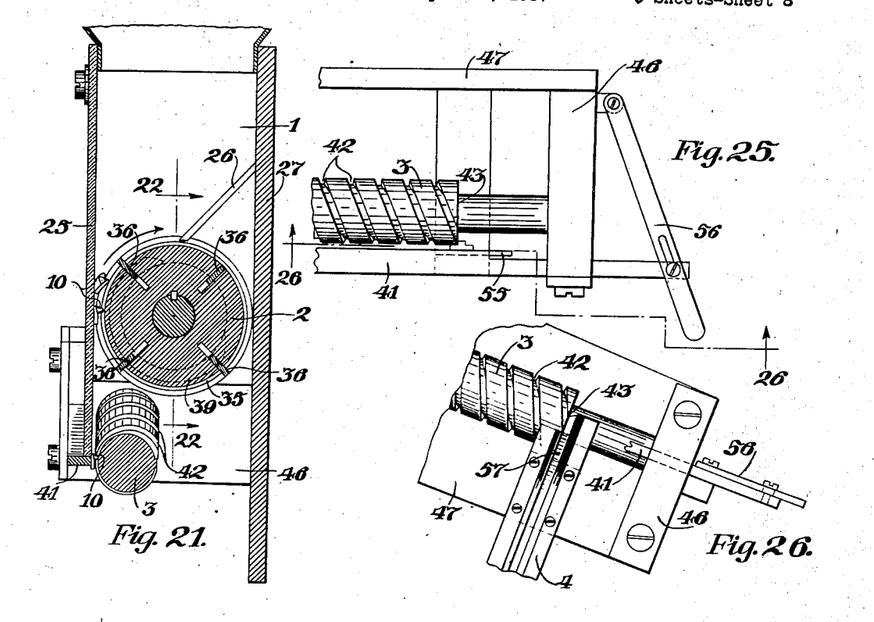
Fig. 25 is a detail view of the manual release mechanism.
Fig. 26 is a section taken on line 26—26 of Fig. 25.
Figure 22:
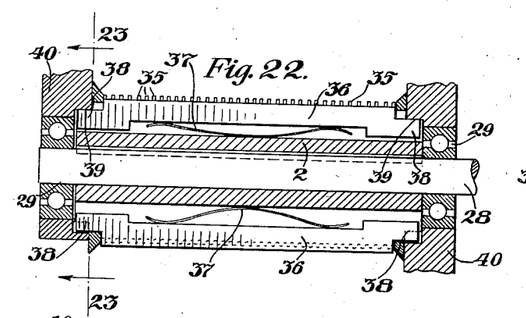
Fig. 22 is a section taken on line 22—22 of Fig. 21.
Figure 23:
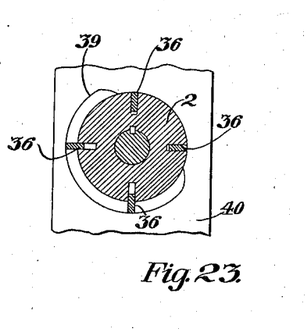
Fig. 23 is a section taken on line 23—23 of Fig. 22.
Figure 24:
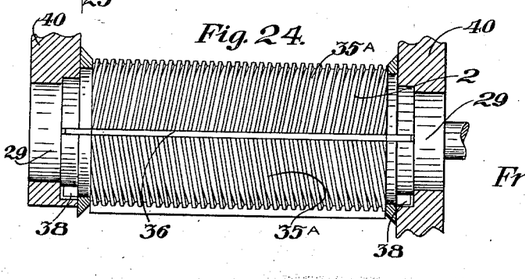
Fig. 24 is a detail view of a modified form of orienting roller.

The roll 2 may be provided with oppositely inclined grooves 35a as shown in Fig. 24 which cause the fastener elements to oscillate in the hopper, or, if desired, the roll may be provided with grooves 35, as shown in Figs. 1 and 13, which extend in the form of a helix about said roll and progressively feed the elements until they drop past the roll and onto the screw conveyor 3. The particular form of grooves may be changed as desired. In the embodiment disclosed, the roll itself tends to agitate the elements so as to assist in the orientation thereof. If sufficient agitation is effected by means of the blades 36 it is obvious that circular and disconnected grooves could be formed in the roll or, if sufficient agitation is attained by means of the grooves, the blades 36 could be omitted. The embodiment disclosed, however, has been found to operate satisfactorily and to orient the fastener elements without permitting any of the elements to become clogged or jammed or to otherwise interfere with the operation of the machine.

The elements which are oriented as above described and pass the roll 2, slide downwardly along the front plate 25 to the screw conveyor 3. They are prevented by positioning plate 41 from passing the screw conveyor and are held with their heads 10 pointed toward the conveyor until the head has engaged a helical groove 42 formed in the conveyor, after which the elements are fed axially by the helical groove 42 until they reach the discharge end 43 of the screw conveyor 3.

The conveyor 3 is also provided with a wide helical groove 44 which extends between the separate convolutions of the feed groove 42 and is of sufficient size to permit any fastener elements whose heads are not properly seated in the groove 42 to drop past the positioning plate 41 into a discard hopper 45. This prevents such elements from clogging the machine or passing to the discharge end 43 of the conveyor 3. Obviously the elements may be collected from the discard hopper 45 and returned therefrom to the supply hopper 1 as desired.

The screw conveyor 3 may be mounted on members 46 which may be carried upon a supporting plate 47 forming an extension of the back plate 27 of the hopper. The plate 47 may be carried upon a pedestal 48 which is mounted upon the base 49 of the machine in any convenient manner. Power may be supplied to the screw conveyor 3 by a pulley 51 and a belt 52, which may be actuated by any convenient source of power, not shown.

The positioning plate 41 extends axially of the screw conveyor 3 in a position to engage the fastener elements as above mentioned. The plate, however, may be slidably held in the members 46 and may be provided at the discharge end 43 with a recess 55 which is adapted to be brought opposite the end of the groove 42 to provide extra space whereby any fastener element which has become improperly positioned may be manually removed. For slidably operating the positioning plate 41 there may be provided a lever 56 which may be pivoted to one of the members 46 and is adapted to cause longitudinal movement of the plate 41 for the above purpose.

The feed chute 4 is provided with a channel 57 which is of a cross-section adapted to receive the fastener elements and is positioned to receive elements discharged from the discharge end 43 of the conveyor 3. A cover plate 58 may be carried by the plate 41 in a position to cover the front of the channel 57 of the feed chute 4 so as to confine the fastener elements therein. The cover plate 58, however, is movable with the positioning plate 41 so that the channel 57 may be exposed when desired to permit manual removal of any fastener element which may have become improperly positioned therein. The plate 58 may be provided with a recess 60 at its upper end which is adapted to provide clearance for manually removing the fastener elements from the top of the channel 57 when the positioning plate 41 has been moved a short distance by means of the lever 56. This permits the top of the channel 57 to be cleared. If a fastener element becomes stuck further down, the lever 56 may be operated a greater distance to remove the entire plate 58 from in front of the channel 57, whereby the channel is exposed for the above purpose. The feed chute 4 may be twisted a half a revolution so as to reverse the position of the fastener elements when they reach the bottom of the chute as indicated in Fig. 20.

Referring to Figs. 2 and 5 to 7, it is noted that the chute 4 ends in a position adjacent the tape 7 to which the fastener elements are to be attached. A spring pressed finger 65 is provided in the lower end of said chute to engage the lower fastener element and to prevent the elements from falling out of the chute until they are forcibly removed therefrom by the setting finger 6.

The setting finger 6 is adapted to engage the top of the lower element in the chute 4 and to extend between the jaws 8 of the element next above. This finger 6 is pivotally mounted in a carriage 66 which is adapted to slide vertically in a channel 67 in a fixed plate 68. For causing vertical movement of the carriage 66 there is provided an arm 70 which may be pivoted to said carriage as at 71 and is pivotally mounted as at 72 upon the frame 73 of the machine. The arm 70 is provided with a roller 74 adapted to engage a cam 75 by which oscillatory movement is imparted to the carriage 66. A plunger 76 pressed outwardly by a spring 77 which may be carried in a housing 78, likewise secured to the frame 73, is adapted to hold the arm 70 in a downward position against the cam 75. A knife linkage 79 may be interposed between the plunger 76 and the arm 70 to reduce the friction of said arm and to permit free movement thereof.

The finger 6 is provided with a shoulder 80 which is adapted to be engaged by a pawl 81 for retracting the finger from the feed chute 4 during the upward stroke of the carriage 66. During the downward stroke the finger 6 is held by a flat spring 82 in position to engage the fastener elements as above mentioned, the pawl 81 being movable about its pivot 83 to permit the shoulder 80 to pass in its downward stroke. A spring 84 is adapted to maintain the pawl 81 in position to engage the shoulder 80 in its upward stroke.

The above described setting mechanism operates to pick out the lower fastener element from the feed chute 4 and to push the same downwardly until it is seated over the edge 7a of the tape 7 in the position shown in Fig. 11. During this downward stroke of the finger 6 the spring pressed finger 65 engages the next fastener element to prevent same from falling out of the chute 4. The finger 65, however, is sufficiently resilient so as not to interfere with the setting of the lower fastener element by the finger 6. Upon the upward stroke of the carriage 66 the finger 6 is retracted until it passes the top of the fastener element resting upon the finger 65.

Figure 5:
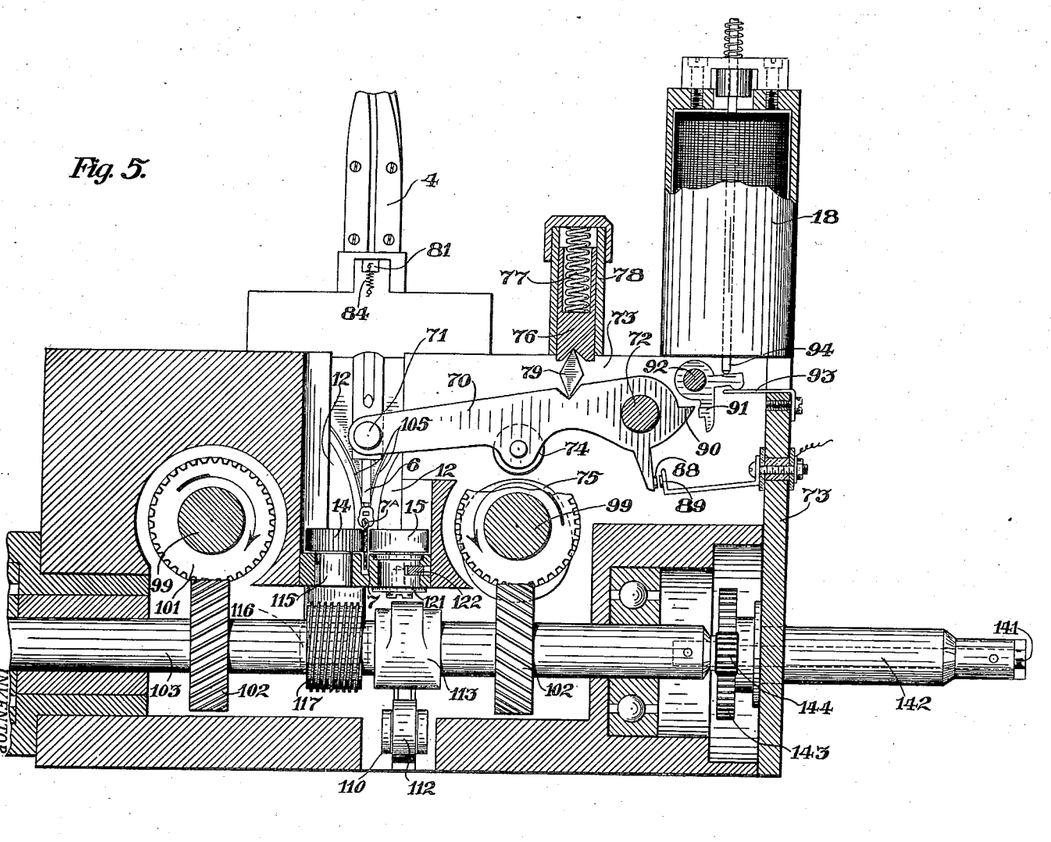
Fig. 5 is a transverse section taken on line 5—5 of Fig. 2 showing the setting mechanism.

Referring to Fig. 5, it will be noted that when the carriage 66 is in its lower position with the finger 6 resting upon the top of the fastener element which has just been set upon the tape 7, the roller 74 is spaced somewhat from the cam 75. This spacing of the roller permits the arm 70 to reach a somewhat lower position when a fastener element is missing, that is, a position in which the finger 6 substantially engages the top of the tape 7. When this happens a contact 88 carried by the arm 70 is caused to engage a stationary contact 89 which is mounted upon the frame 73 of the machine and is adapted to control suitable relays, to be described, for preventing operation of the counting mechanism. The arm 70 is also provided with a shoulder 90 adapted to engage a pawl 91 which is pivoted as at 92 to the frame 73 of the machine so as to lock the arm 70 in its upper position. Pawl 91 is normally held out of engagement with the shoulder 90 of the arm 70 by means of a spring 93 secured to the frame 73. It may be operated, however, by a plunger 94 which is controlled by the lockout solenoid 18 so as to bring the pawl 91 into engagement with the shoulder 90 when the solenoid 18 is energized and thereby lock the arm 70 in its upper position so as to interrupt further operation of the setting mechanism until the lockout solenoid 18 is again de-energized. The lockout solenoid 18 is energized by suitable relays to be described, controlled by the counting mechanism 20.

Figure 4:
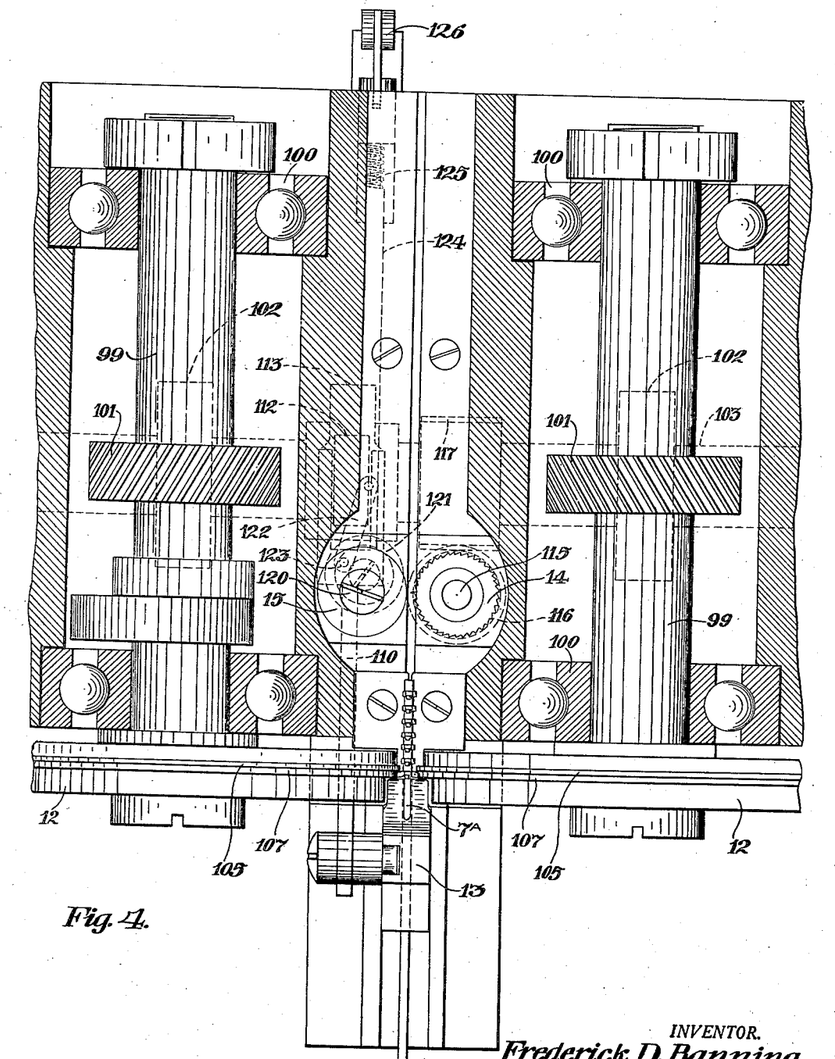
Fig. 4 is a horizontal section taken on line 4—4 of Fig. 2 showing the drive shafts and pull mechanism.

The clamping mechanism is illustrated in Figs. 4, 8 and 9 as comprising a pair of cam rollers 12 mounted upon shafts 99 which are journalled in suitable bearings 100 and carry driven gears 101 meshing with driving gears 102 (Fig. 5) which are carried by a driving shaft 103. The rollers 12 include positioning flanges 105 which are adapted to extend between adjacent fastener elements for properly spacing the element which has just been set. The flange 105 tapers, as at 106 (Fig. 8) toward its forward end so as to provide clearance to permit it to be inserted between successive fastener elements for the above purpose. The rollers 12 also include cams 107 which are adapted to progressively press the jaws 8 of the fastener elements so as to close said jaws from the position shown in Fig. 11 and to cause said jaws to firmly engage and clamp the edge 7a of the tape 7 as shown in Fig. 12. The cams 107 are so positioned with respect to the flange 105 and with respect to the setting mechanism so that space is provided to receive the fastener element from the setting mechanism on its downward stroke and so that the element is clamped firmly against the tape during the upward stroke of the setting mechanism.

After the elements have been set and clamped as above described, the tape 7 is fed to a position to receive the next element by means of the presser foot 13 (Fig. 2) which is carried by an arm 110 normally held in retracted position by a spring 111 and carrying a roller 112 engaging a cam 113 mounted upon the shaft 103 (Fig. 5). The presser foot 13 saddles the tape freely and is adapted to abut against the last said element to advance the tape for spacing between adjacent elements. The cam 113 is so timed as to advance the tape while the finger 6 of the setting mechanism is elevated and while the cams 107 are disengaged from the element. The cam 113 is preferably so formed that the tape is fed an amount slightly less than the required spacing between successive elements, the remaining amount of feed being obtained by the positioning flange 105 as above mentioned. During any interval when the setting finger does not pick up an element the tape is not advanced because the presser foot must necessarily act against an element previously set on the tape. Therefore, when no element is advanced from the feed chute and set on the tape the presser foot will not advance the tape.

In order to keep the tape advancing regularly and without slack occurring between the presser foot 13 and the rolls 14 and 15 which are described later on in more detail, there is provided a slotted guide 221 as shown best in Figs. 9 to 12 inclusive. This guide supports the tape 7 with the ends of the fastener element legs slidably bearing against its top surface and maintains the tape in alignment between the presser foot 13 and rolls 14 and 15 as the presser foot advances the tape.

For intermittently advancing the tape a longer distance, a continuously rotating pull roll 14 (Figs. 4 and 10) is provided which is mounted on a shaft 115 (Fig. 5) carrying a driven gear 116 cooperating with a worm 117 carried by the driving shaft 103. The pull roll 14 is continuously operated as long as power is supplied to the machine by the driving shaft 103. The idler roll 15 is loosely mounted on a pin 120 which is carried eccentrically in a shaft 121 (Figs. 4, 5 and 10) which may be supported by the frame of the machine in any convenient manner. A link 122 is connected to the shaft 121 as by a pin 123 in a position to cause rotating of said shaft and for thereby bringing the roll 15 into engagement with the tape 7. The roll 15 thus presses the tape against the pull roll 14 and the tape is advanced until the idler roll 15 is again retracted. For operating the link 122 there is provided a rod 124 (Figs. 2 and 10) which is normally held by a spring 125 in position to retract the roll 15 from engagement with the tape. The rod 124 is connected by a set of levers 126 to the armature 127 of the pull magnet 16 in such manner that the roll 15 is brought into engagement with the tape whenever the pull magnet is energized.

The counting mechanism 20 is illustrated in Figs. 27 to 32 as comprising a base plate 130 which is adapted to be attached to the side of the machine as indicated in Fig. 1. The base plate 130 carries a fixed sleeve 131 which is rigidly secured thereto as by screws 132 and carries on its outer surface a rotating sleeve 133 and on its inner surface bearings 134. The rotating sleeve 133 is attached to a worm gear 135 by which the sleeve is driven, and is caused to rotate about fixed sleeve 131. The worm gear 135 meshes with a worm drive 137 which is carried upon a shaft 138 terminating in a coupling member 139 having a slot 140 adapted to be engaged by a key 141 (Fig. 5) formed upon the end of a shaft 142 which is journalled in the frame 73 and carries a gear 143 meshing with a spur gear 144 which is attached to the driving shaft 103.

The rotating sleeve 133 also carries a ratchet wheel 148 provided with ratchet teeth 149 around its periphery. The ratchet wheel 148 may be provided with a central aperture 150 to provide access to the bearings 134, which aperture may be covered by a fixed plate 151.

A hollow shaft 155 may be journalled in the bearings 134. This shaft 155 may have an arm 156 journalled thereon. Said arm 156 may be provided with a hub 158 to which is attached one end of a coil spring 159, the other end of said spring being secured to a fixed drum 160 which is mounted on a standard 161 carried by the base plate 130. A cap 162 may be provided for closing the drum 160 so as to shield the spring 159. A lever 165 is pivotally attached to the end of the arm 156 as by a pivot 166. The lever 165 carries a pawl 167 having a pair of lips 168 and 169 respectively, which are adapted to engage the teeth 149 of the ratchet wheel 148. The lever 165 is normally held in a lower position and the pawl 167 is locked against ratchet teeth 149 by means of a spring 170 which is anchored to a lug 171 formed on the arm 156.

Figures 29, 30, 31, 32:
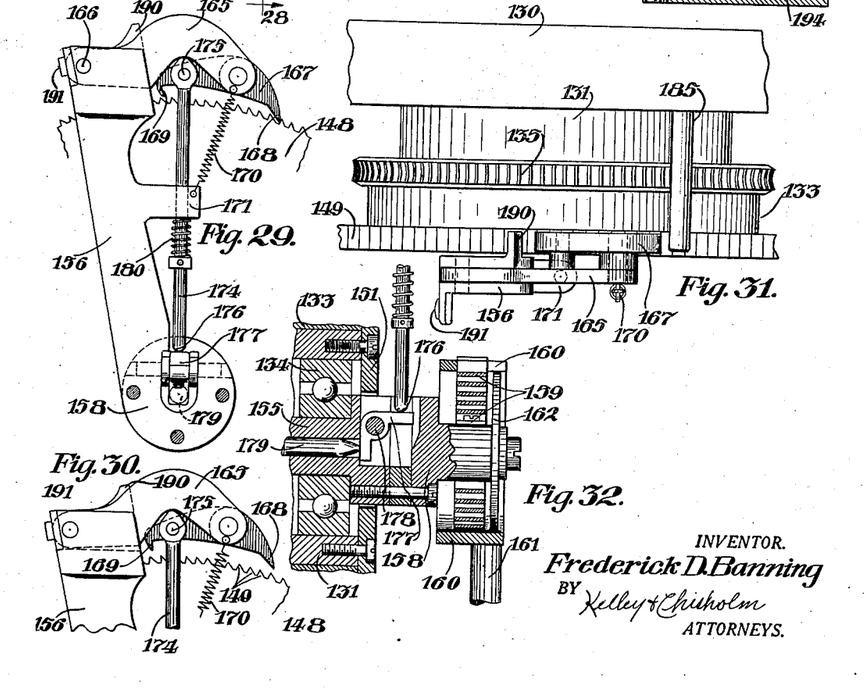
Fig. 29 is a detail view of a portion of the counting mechanism.
Fig. 30 is a detail view of a portion of the mechanism of Fig. 29 in a different operating position.
Fig. 31 is a plan view of the counting mechanism.
Fig. 32 is a detail view of the central bearing by which the counting mechanism is supported.

For controlling the position of the pawl 167 there is provided a push rod 174 which is pivotally connected to the pawl as at 175, extends through a suitable bearing in the lug 171 and enters a bore 176 in the hub 158 of the arm 156. The end of the rod 174 engages a lever 177 which is pivoted as at 178 to the hub 158 and is controlled by a plunger 179 which is journalled in the hollow shaft 155. A spring 180 is adapted to normally hold the pawl in such position that the lip 169 engages the ratchet teeth 149. The arrangement is such that when the push rod 174 is elevated slightly the pawl 167 rotates about its pivot, thereby releasing the lip 169 from the ratchet teeth 149, and bringing the lip 168 into engagement therewith as shown in Fig. 29. When the rod 174 is again lowered the lip 169 is again brought into engagement with the ratchet teeth, the raising and lowering of the lever in the above described manner causing the pawl to advance a distance of one tooth with respect to the ratchet wheel 148. This movement, as will be explained, compensates for a missing fastener element in the setting mechanism.

Further movement of the rod 174 causes the lever 165 to pivot about its pivot 166 thereby releasing the entire ratchet mechanism from the ratchet wheel 148 as shown in Fig. 30, and permitting the coil spring 159 to swing about the hollow shaft 155 in its original starting position.

For setting the starting position of the ratchet mechanism there is provided a pin 185 which is mounted in a ring 186. The ring is rotatably mounted in a suitable channel in the base plate 130 and may be provided with an internal rack 188 adapted to mesh with a spur gear, not shown, which may be operated by a suitable control shaft located in a recess 189 formed in the plate 130. This provides means for rotating the ring 186 so as to locate the pin 185 as required. The pin 185 is adapted to engage a lip 190 carried by the arm 156 for controlling the position of said arm. The arm 156 also carries a contact 191 which is adapted to engage a fixed contact 192 when the arm 156 has rotated to the selected position. The fixed contact 192 is carried upon a flat spring 193 which is attached to an insulating piece 194 carried by the base plate 130. The contact 192 is adapted, when closed, to operate relays to be described for interrupting the operation of the setting mechanism, for energizing the pull magnet to advance the tape, and for energizing a solenoid 196 which is adapted to release the pawl 167 so as to permit the arm 156 to be reset for another counting operation. The solenoid 196, hereinafter called the countersolenoid, may be secured to the plate 130 and may include a plunger 197 adapted to engage and actuate the plunger 179 for the purpose above specified. A suitable scale 198 may be formed on the plate 130 to indicate the desired setting of the pin 185. This scale may be graduated for example to indicate numbers of elements which are to be set during each operating cycle.

Figure 3:
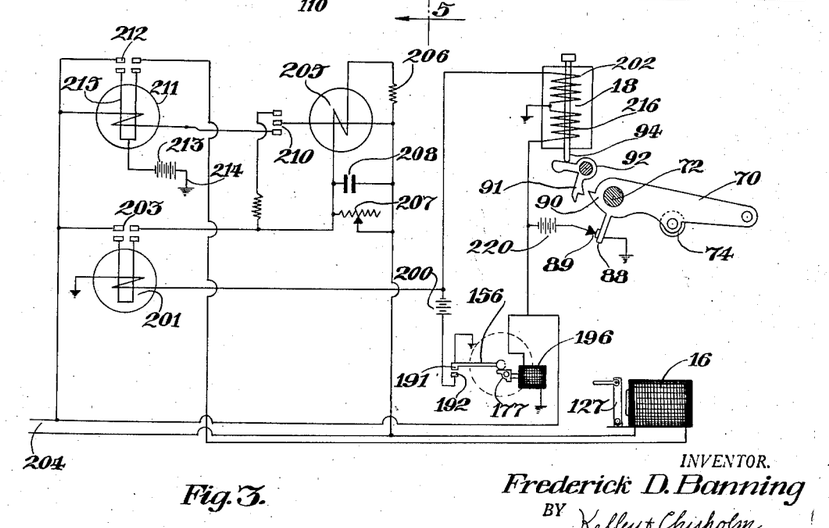
Fig. 3 is a wiring diagram illustrating the electrical control circuits.

The control circuits for actuating the above mentioned relays are illustrated in Fig. 3. Referring to this figure, with the machine operating in a normal manner, the contacts 191 and 192 are open and all of the relays are de-energized. When the arm 156 of the counting mechanism has advanced to a position to close the contacts 191 and 192 a circuit is closed through the battery 200 to a battery relay 201 and to a coil 202 of the lockout solenoid 18. The energization of the coil 202 causes movement of the plunger 94 which causes the pawl 91 to engage the shoulder 90 of the arm 170 when the arm is next brought to elevated position, thereby locking the arm in elevated position and preventing further operation of the setting mechanism until the lockout solenoid 18 is de-energized. Energization of the relay 201 closes contacts 203 which complete a circuit from a supply line 204, such as a 110 volt D. C. line, through a slow opening relay 205 having an electrical delay network such as resistance 206, rheostat 207, and a condenser 208 connected thereto in a manner to retard the opening of the relay 205 a predetermined time after the contacts 203 have been opened. The timing is controlled by adjustment of the rheostat 207 which controls the rate of discharge of the condenser 208. A relay of this type is capable of accurate adjustment and may be set to delay opening by any desired interval after the energizing circuit has been broken.

Energization of relay 205 causes contact 210 to close, thereby energizing a relay 211 and causing the same to close contacts 212 which complete a 110 volt circuit from the line 204 to the pull magnet 16. A battery 213, grounded as at 214, may be connected to the armature 215 of the relay 211 so that when the contacts 212 are closed a battery circuit is established from battery 213 through the armature 215 and one side of the 110 volt line 204 to the countersolenoid 196 and to a holding coil 216 forming a part of the lockout solenoid 18. Completion of the 110 volt circuit causes the pull magnet 16 to operate for advancing the tape. It also causes the countersolenoid 196 to operate, thereby elevating the rod 174, releasing the ratchet mechanism and permitting the arm 156 to be returned by the spring 159 to its original position. As soon as the return movement of the arm 166 begins the contacts 191 and 192 are broken, thereby de-energizing relay 201 and coil 202 of the lockout solenoid 18. It is necessary however, to hold the energization of the countersolenoid 196 and of the lockout solenoid 18 until the arm 156 has had an opportunity to return to its starting position. This is accomplished by the slow opening relay 205 which holds the contact 210 closed and consequently holds the circuit to the countersolenoid 196 and the pull magnet 16 an interval of time determined by the position of the rheostat 207 described above. During the time, however, the coil 202 of the lockout solenoid 18 is de-energized, consequently in order to prevent operation of the setting mechanism the holding circuit is established through the holding coil 216 from the contact 212 and battery 213. This coil 216 will remain energized as long as the contacts 212 are closed thereby preventing the setting mechanism from resuming operation. When a sufficient interval has elapsed to permit the arm 156 to return to its initial position the relay 205 releases, thereby releasing contact 212 and opening all of the circuits described above. The pull of the tape is thus stopped, the counter mechanism is again rendered operative and the setting operations are resumed.

In the event that a fastener element is not picked up by the finger 6 during any working stroke, the arm 70 moves an additional distance sufficient to close the contacts 88 and 89. This momentarily completes the circuit through a battery 220 to the countersolenoid 196 causing a movement of the rod 171 sufficient to advance the ratchet mechanism a distance of one tooth about the ratchet wheel 148. This distance is so regulated that the arm 156 remains stationary and the wheel 148 is permitted to rotate with respect thereto. This operation is repeated at each stroke of the setting mechanism in which no fastener element is engaged by the finger 6. When such an element is again picked up, contacts 80 and 89 remain open, pawl 167 again locks against the wheel 148, and arm 156 again advances as long as fastener elements are being set.

It will be noted that the above described mechanism alternately operates to feed, set and clamp the fastener elements in position on a tape without manual attention as long as operating power is supplied. The orienting mechanism serves to pick the elements out of a hopper, to orient the same, to supply them to a feeding mechanism which discards any elements which are improperly fed and supplies the others to the setting device. The setting device alternately picks out successive fastener elements from the feed chute 4 and sets them in position on a tape. The clamping mechanism then accurately spaces the elements and clamps them in position on the tape. After this the tape is automatically fed to a suitable position for receiving the next successive element.

The counting mechanism alternately controls the device so as to advance the tape between groups of elements and automatically compensates for any working stroke of the setting mechanism during which a fastener element is not present therein. The entire operation is efficient and continuous and requires a minimum amount of attention. If any elements are not properly fed to the feed chute, the positioning bar 141 may be moved by means of the hand lever 56 so as to permit them to be manually removed.

The embodiment of the invention disclosed is capable of accomplishing the purposes above set forth in an efficient and commercially practical manner. It is evident, however, that the details may be varied by persons skilled in the art and that various modifications and substitutions may be made. The embodiment disclosed is intended merely as an illustration and not as a limitation on the scope of the invention. The invention is only to be limited in accordance with the following claims when interpreted in view of the prior art.

I claim:

1. In a machine for feeding fastener elements and the like, a hopper for said elements, means to orient said elements and to feed the same to a setting mechanism, means to set said elements on a tape, means to clamp said elements to said tape, means to feed the tape between successive setting operations, counting means adapted to count the elements so set and to alter the feed after a predetermined number of elements have been set, and means to render said counting means inoperative when an element is missing from said setting mechanism.

2. In a machine for setting fastener elements and the like, a setting mechanism adapted to set said elements on a tape, means to feed said elements to said setting mechanism, stepwise tape feed mechanism for spacing successive fastener elements in a group, a pull mechanism adapted to advance said tape to provide extra spacing between groups of elements, a counting mechanism adapted to count the number of elements which have been set, and a control circuit actuated by said counting mechanism after a predetermined number of elements have been set, said control circuit being adapted to interrupt said setting mechanism and to actuate said pull mechanism for advancing the tape so as to provide a space between groups of elements, and timed means associated with said control circuit to stop said pull mechanism and to render said setting mechanism operative after a predetermined interval of time.

3. In a machine for setting fastener elements and the like, a setting mechanism adapted to set said elements on a tape, means for feeding said elements to said setting mechanism, stepwise tape feed mechanism for spacing successive fastener elements in a group, a counting mechanism adapted to count the number of elements set, pull mechanism adapted to advance said tape, an electric control circuit adapted to control the operation of said pull mechanism, a second control circuit adapted when energized to interrupt the operation of said setting mechanism, a third control circuit adapted to restore said counting mechanism to its initial position, a relay energized by said counting mechanism after a predetermined number of elements have been set, said relay being adapted to be de-energized when said counting mechanism is being returned to its initial position, and holding means to hold said control circuit in energized condition a length of time sufficient to permit the counting mechanism to be restored to initial position and to permit the tape to be advanced a given amount prior to the next setting operation.

4. In a machine for setting fastener elements and the like having projecting heads and tape gripping jaws, setting mechanism adapted to set elements in spaced position on a tape, a supply hopper for said elements, orienting means for orienting elements in said hopper, feed means for feeding oriented elements from said hopper to said setting mechanism, said feed means comprising a screw conveyor having helical grooves adapted to receive the heads of said elements and a guide bar extending axially of said conveyor and positioned with respect thereto so as to cause elements to be carried along by said conveyor with their heads in said helical groove and said gripping jaws depending in aligned vertical relationship, and a feed chute adapted to receive said elements from the discharge end of said conveyor and to feed same to said setting mechanism.

5. In a machine for setting fastener elements and the like having projecting heads, setting mechanism adapted to set said elements in spaced relationship on a tape, a supply hopper for said elements, orienting means for orienting the elements in said hopper, feed means for feeding oriented elements from said hopper to said setting mechanism, said feed means comprising a screw conveyor having helical grooves adapted to receive the heads of said elements and a guide bar extending axially of said conveyor, said guide bar being so positioned with respect thereto as to cause the elements to be carried along by said conveyor with their heads in said helical grooves, a feed chute adapted to receive said elements from the discharge end of said conveyor and to feed same to said setting mechanism, and means for moving said guide bar axially of said screw conveyor to provide access for permitting improperly fed elements to be manually removed.

6. In a machine for setting fastener elements and the like having projecting heads, setting mechanism adapted to set elements in spaced position on a tape, a supply hopper for said elements, orienting means for orienting elements in said hopper and feed means for feeding oriented elements from said hopper to said setting mechanism, said feed means comprising a screw conveyor having helical grooves adapted to receive the heads of said elements and a guide bar extending axially of said conveyor, said guide bar being so positioned with respect thereto as to cause the elements to be carried along by said conveyor with their heads in said helical grooves, a feed chute adapted to receive said elements from the discharge end of said conveyor and to feed same to said setting mechanism, said screw conveyor having an additional helical groove extending over a portion of its length and of sufficient size to permit any elements which are improperly positioned to pass said guide bar and to be discharged from said screw conveyor.

7. In a machine for setting fastener elements and the like having projecting heads, setting mechanism adapted to set elements in spaced position on a tape, a supply hopper for said elements, orienting means for orienting elements in said hopper and feed means for feeding oriented elements from said hopper to said setting mechanism, said feed means comprising a screw conveyor having helical grooves adapted to receive the heads of said elements and a guide bar extending axially of said conveyor, said guide bar being so positioned with respect thereto as to cause the elements to be carried along by said conveyor with their heads in said helical grooves, a feed chute adapted to receive said elements from the discharge end of said conveyor and to feed same to said setting mechanism, said guide bar having a recess which is adapted to be positioned opposite the discharge end of said conveyor in response to manual movement of said guide bar, said recess affording clearance to permit improperly fed elements to be manually removed from the top of said feed chute, and a plate carried by said guide bar adapted to cover the upper part of said chute, said plate being adapted to be removed from said feed chute to expose the elements therein in response to axial movement of said guide bar.

8. In a machine for setting fastener elements on a tape, a setting mechanism, orienting means adapted to supply elements to the setting mechanism through a feed chute, a spring finger adapted normally to prevent passage of said elements to said setting mechanism, the setting mechanism comprising a spring pressed reciprocating finger adapted to engage the lower element in the feed chute and forcibly push it past said spring finger, a lever for reciprocating the setting finger, a cam for operating said lever upwardly and a spring for operating it downwardly, said setting finger adapted to rest on the head of each element set on the tape and said spring acting on said lever urging said finger to a lower position when an element is not operatively engaged thereby, and control devices for controlling the spacing of the elements on the tape dependent on the extent of the downward movement of the setting finger.

9. In a machine for setting fastener elements and the like, a setting mechanism, a feed chute adapted to feed elements thereto, a spring finger located at the lower part of said chute and adapted to normally prevent passage of elements to said setting mechanism, said setting mechanism comprising a finger adapted to engage the lower element and to forcibly push the same past said spring finger into setting position, means to retract said setting finger from said elements during its upward stroke, a reciprocating carriage carrying said setting finger, means whereby said carriage moves an additional distance when no fastener element is operatively engaged by said setting finger, means responsive to said additional movement to actuate a control circuit, and remote control means adapted to lock said carriage in its upper position for interrupting the operation of said setting mechanism.

10. In a machine for setting fastener elements and the like on a tape, means to feed and set said elements in predetermined spaced relationship on said tape, means to advance said tape for spacing between elements, clamping means adapted to clamp said elements on said tape comprising a pair of rolls oppositely disposed with respect to said elements and mounted at right angles to said tape, said rollers having cam surfaces extending lengthwise of the legs of said elements and movable against said legs in such lengthwise direction when said rollers are rotated to compress said legs on said tape.

11. In a machine for setting fastener elements and the like on a tape, means to feed and set said elements in predetermined spaced relationship on said tape, clamping means adapted to clamp said elements thereto, said clamping means comprising a pair of rolls oppositely disposed with respect to said elements and having cams adapted to engage opposite sides thereof, said cams being adapted when rotated to compress said elements and to cause same to clamp said tape, and positioning flanges carried by said rolls to enter between the last two elements for accurately spacing the same prior to the clamping operation.

12. In a machine for setting fastener elements and the like on a tape, means to feed and set said elements in predetermined spaced relationship on said tape, clamping means adapted to clamp said elements thereto, said clamping means comprising a pair of rolls oppositely disposed with respect to said elements and having cams adapted to engage opposite sides thereof, said cams being adapted when rotated to compress said elements and to cause same to clamp said tape, and a presser foot adapted to engage the element last set and to move same with the tape a predetermined amount, whereby the tape is automatically fed into position for receiving the next element.

13. In a machine for setting fastener elements and the like on a tape, means to feed and set said elements in predetermined spaced relationship on said tape, clamping means adapted to clamp said elements thereto, said clamping means comprising a pair of rolls oppositely disposed with respect to said elements and having cams adapted to engage opposite sides thereof, said cams being adapted when rotated to compress said elements and to cause same to clamp said tape, a presser foot adapted to engage the element last set for advancing the same with the tape a given amount less than the required spacing between successive elements, and positioning flanges carried by said rolls to enter between the last two elements for accurately spacing the same prior to the clamping operation.

14. In a machine for setting fastener elements and the like on a tape, means to automatically feed and set said elements and means to advance said tape a greater distance than the usual spacing between adjacent elements on the tape, said means comprising a continuously rotating roller, an idler roller mounted opposite thereto, a pin, means for eccentrically mounting said idler roller on said pin and means for rotating said pin to cause said idler roller to press said tape against said first roller, whereby said tape is advanced to provide gap spaces between successive fastener lengths.

15. In a machine for setting fastener elements and the like on a tape, means to automatically feed and set said elements, and counting mechanism associated therewith adapted to count the elements so set, said counting mechanism comprising a ratchet wheel having teeth, an arm movable about an axis concentric with said wheel and carrying a pawl normally locked against said teeth, whereby said arm and said ratchet wheel move as a unit, spring means for restoring said arm to its initial position, and means operable when said arm is rotated a predetermined distance to release said pawl for permitting said arm to be reset by said spring means.

16. In a machine for setting fastener elements and the like on a tape, means to automatically feed and set said elements and counting mechanism associated therewith adapted to count the elements so set, said counting mechanism comprising a ratchet wheel having teeth corresponding to the elements to be set, an arm movable about an axis concentric with said wheel and carrying a pawl normally locked against said teeth whereby said arm and said ratchet wheel move as a unit, an adjustable stop adapted to determine the initial position of said arm, means actuated when said arm has advanced to a given position to release said pawl, spring means to return said arm to said initial position when said pawl is thus released, and means responsive to the absence of a fastener element in the setting mechanism to cause a movement of said pawl adapted to permit said ratchet wheel to advance a distance of one tooth in respect to said arm, whereby said counting mechanism is rendered ineffective when no fastener element is present in said setting mechanism.

FREDERICK DUNLEVY BANNING.